United States Patent
Nikolov et al.

(10) Patent No.: US 11,051,089 B1
(45) Date of Patent: Jun. 29, 2021

(54) MICROWAVE PHOTONICS ENABLED BEAM-FORMING AND CHANNELIZATION

(71) Applicant: The Boeing Company, Chicago, IL (US)

(72) Inventors: Anguel Nikolov, Culver City, CA (US); Kurt W. Loheit, Rancho Palos Verdes, CA (US); Siddhartha Ghosh, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/832,828

(22) Filed: Mar. 27, 2020

(51) Int. Cl.
*H04J 14/02* (2006.01)
*H04Q 11/00* (2006.01)
(Continued)

(52) U.S. Cl.
CPC ....... *H04Q 11/0005* (2013.01); *H04B 10/516* (2013.01); *H04B 10/61* (2013.01);
(Continued)

(58) Field of Classification Search
CPC ....... H04Q 11/0005; H04Q 2011/0013; H04Q 2011/0015; H04Q 2011/0016; H04Q 11/0001; H04B 10/516; H04B 10/61; H04B 2210/006; H04B 10/506; H04B 10/2575; H04B 10/60; H04B 10/50; H04B 10/548; H04B 10/25752; H04J 14/02; H04J 14/0298; H04J 14/0278; H04J 14/0279;
(Continued)

(56) References Cited

U.S. PATENT DOCUMENTS 5,761,351 A * 6/1998 Johnson ............... H01Q 3/2676
343/853
10,069,565 B2 9/2018 Gallagher et al.
(Continued)

OTHER PUBLICATIONS

Esman et al., "Comb-Assisted Cyclostationary Analysis of Wideband RF Signals," IEEE, Journal of Lightwave Technology, 2016, pp. 1-8.
(Continued)

*Primary Examiner* — Hibret A Woldekidan
(74) *Attorney, Agent, or Firm* — MH2 Technology Law Group LLP (57) ABSTRACT

A receiver and a transmitter are disclosed that are applicable to space, air or ground RF communication systems and are applicable to systems where one or more signals of multiple types and characteristics are present in any given beam such as a communication spot beam on a high-throughput satellite. The transmitter can include an optical frequency comb configured to generate a multitude of equidistantly spaced optical wavelengths; an electro-optic modulator that receives the multitude of equidistantly spaced optical wavelengths and a data signal and produce a modulated optical beam; an optical circulator that receives the modulated optical beam; an optical switch that switches the modulated optical beam to an output port of the optical switch terminated in one or more Fiber-Bragg gratings; a wavelength division multiplexer that receives individual wavelengths of the modulated optical beam that are time-delayed from the optical circulator; and a plurality of antenna elements.

20 Claims, 6 Drawing Sheets

(51) Int. Cl.
*H04B 10/516* (2013.01)
*H04B 10/61* (2013.01)

(52) U.S. Cl.
CPC ...... *H04J 14/02* (2013.01); *H04Q 2011/0013* (2013.01); *H04Q 2011/0015* (2013.01); *H04Q 2011/0016* (2013.01)

(58) Field of Classification Search
CPC ..... H04J 14/0282; H01Q 3/2676; H01Q 3/22; H01Q 3/2682; H01Q 21/22; G01S 2013/0254; G02B 26/106; H01S 5/0656; H01S 5/141; H01S 5/142; H01S 5/146
USPC ... 398/49, 45, 53, 68, 79, 87, 115, 140, 182, 398/183, 185, 202, 208, 211, 69, 116
See application file for complete search history.

(56) References Cited

U.S. PATENT DOCUMENTS

| | | | |
|---|---|---|---|
| 10,142,021 B2 | 11/2018 | Turgeon et al. | |
| 10,320,481 B2 | 6/2019 | Wang et al. | |
| 2005/0226554 A1* | 10/2005 | Kawanishi | G02B 6/29394 385/27 |
| 2008/0212974 A1* | 9/2008 | Davies | H04B 10/2575 398/140 |
| 2016/0018319 A1* | 1/2016 | Hegyi | G01R 31/382 356/73.1 |
| 2017/0310006 A1* | 10/2017 | Vidal Drummond | H01Q 3/2676 |
| 2018/0219645 A1* | 8/2018 | Giraldo | H04B 10/506 |
| 2019/0020109 A1* | 1/2019 | Puleri | H01Q 3/2676 |

OTHER PUBLICATIONS

Komiyama et al., Development of Resource Allocation Reconstruction Technology (Digital Beam Former and Digital Channelizer), Journal of the National Institute of Information and Communications Technology vol. 62 No. 1 (2015), pp. 151-163.

Piqueras et al., "High speed, high frequency electro-photonic ADC for space enabled routers and flexible antennas", ICSO 2016 International Conference on Space Optics, held in Biarritz, France, Oct. 18-21, 2016, Proc. of SPIE, vol. 10562, 105625U1-9 (9 pages).

Wiberg et al., "Coherent Filterless Wideband Microwave/Millimeter-Wave Channelizer Based on Broadband Parametric Mixers," Journal of Lightwave Technology, vol. 32, No. 20, Oct. 15, 2014, pp. 3609-3617.

Xie et al., "Broadband Photonic RF Channelization Based on Coherent Optical Frequency Combs and I/Q Demodulators," IEEE Photonics Journal, Broadband Photonic RF Channelization, vol. 4, No. 4, Aug. 2012, pp. 1196-1202.

Yoo et al, "Terahertz Information and Signal Processing by RF-Photonics," IEEE Transactions on Terahertz Science and Technology, vol. 2, No. 2, March 2012, pp. 167-176.

* cited by examiner

MICROWAVE PHOTONICS ENABLED BEAM-FORMING AND CHANNELIZATION

FIELD

The present disclosure relates to systems and methods for microwave photonics-enabled beam-forming and channelization.

BACKGROUND

In conventional radio frequency (RF) designs, phased array antenna beam forming relies on electronically controlled phase shifters to align independent array elements. Both the RF components and phase shift components create bandwidth and dynamic range limitations. Increasing the bandwidth introduces RF beam perturbations such as beam squint. In digital beam forming after initial down conversion to an intermediate frequency, a high sampling rate analog-to-digital conversion (ADC) is needed, but this comes as a tradeoff to ADC resolution. This limits the modulation order and ultimately reduces the available data rate. Current systems for satellite, airborne and ground communications are looking to increase capacity through bandwidth efficient modulation schemes (e.g., digital video broadcast satellite 2 ((DVBS-II)) that implement waveforms greater than 128 Quadrature Amplitude Modulation (QAM) and wider bandwidth channels in the millimeter wave (mmW or MMW) spectral bands. This expansion in bandwidth and modulation order creates challenges for the front end radio frequency (RF) and digital sampling components. The same issues are present in transmission when all electrical channelization and beam forming are used.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In accordance with examples of the present disclosure, a receiver is disclosed. The receiver comprises a phased array antenna having P receiving elements configured such that each of the P receiving elements modulates one of P optical modulators; a first optical frequency comb configured to generate a multitude of equidistantly spaced optical wavelengths; a first 1 by P wavelength division multiplexer (WDM1) configured to receive the multitude of equidistantly spaced optical wavelengths and further configured to split the multitude of equidistantly spaced optical wavelengths into individual optical wavelengths such that each individual optical wavelength is outputted as a separate carrier signal to each of the P optical modulators such that a total incoming radio frequency (RF) beam field incident on each of the P receiving elements modulates a separate optical wavelength in each optical modulator; a second wavelength division multiplexer (WDM2) configured to receive each output from each of the optical modulators, such that all modulated wavelengths are combined together into a single output to form a combined signal; and an N input ports by M output ports optical switch configured to receive the combined signal from the WDM2 into at least one input port, and further configured to switch the combined signal to an output port terminated in one Fiber-Bragg grating (FBG), each FBG having different wavelength dispersion properties, such that different time delays are introduced between different wavelengths in each fiber.

In some examples, in the receiver, the first optical frequency comb is configured such that adjacent frequency separation is more than 2 times larger than a maximum RF frequency expected to be received by phased array receiving elements.

In some examples, in the receiver, the first wavelength division multiplexer (WDM1) has channel to channel separation equal to an adjacent frequency spacing of the first optical frequency comb.

In some examples, in the receiver, the second wavelength division multiplexer (WDM2) has channel to channel separation equal to an adjacent frequency spacing of the first frequency comb.

In some examples, in the receiver, the second wavelength division multiplexer (WDM2) is configured to have a bandpass more than 2 times larger than a maximum RF frequency expected to be received by the phased array elements.

In some examples, in the receiver, a number of channels in WDM1 and WDM2 are at least a number of phased array receiving elements.

In some examples, in the receiver, optical paths between WDM1 and WDM2, including each optical modulator are equal within 1 mm difference.

In some examples, the receiver further comprises an optical amplifier and a wavelength independent splitter with N output ports, wherein the optical amplifier and the wavelength independent splitter are interposed between the WDM2 and the optical switch such that the WDM2 outputs to the optical amplifier which in turn outputs to the wavelength independent optical splitter which in turn outputs to each input port of the optical switch.

In some examples, in the receiver, the FBGs at outputs of the optical switch introduce time delays between the different wavelengths that are representative of true time delays with which phased array receiver elements are illuminated from RF beam field wave-fronts arriving from different directions.

In some examples, in the receiver, a number of N inputs for the optical switch corresponds to a number of RF beams that can be simultaneously acquired on the phased array receiver elements.

In some examples, in the receiver, a number of M outputs from the optical switch correspond to a number of different RF beam directions that can be resolved.

In some examples, in the receiver, the optical switch enables selection of the output port with the FBG that introduces specific true time delays between wavelengths representative of a selected RF beam direction.

In some examples, in the receiver, the receiver further comprises an optical circulator that is interposed between the WDM2 and the FBGs.

In some examples, in the receiver, an output of the optical circulator carries all wavelengths representing signals from individual phased array elements forming a specific beam direction due to a true time delay imposed between different wavelengths.

In some examples, in the receiver, the output of the optical circulator is routed to a signal channelization and processing elements.

In some examples, the receiver provides for simultaneous parallel acquisition processing of N RF beam directions to occur.

In accordance with examples of the present disclosure, a transmitter is disclosed. The transmitter comprises an optical frequency comb configured to generate a multitude of equidistantly spaced optical wavelengths; an electro-optic modulator (EOM) configured to receive the multitude of equidistantly spaced optical wavelengths and a data signal and produce a modulated optical beam that is modulated with the data signal; an optical circulator configured to receive the modulated optical beam at an input port; an N input ports by M output ports optical switch configured to receive the modulated optical beam from a first output port of the optical circulator, and further configured to switch the modulated optical beam to an output port of the optical switch terminated in one or more Fiber-Bragg gratings (FBGs), each FBG having different wavelength dispersion properties, such that different time delays are introduced between different wavelengths in each fiber; a 1 by P wavelength division multiplexer (WDM1) configured to receive individual wavelengths of the modulated optical beam that are time-delayed from a second output port of the optical circulator; and a plurality of antenna elements, wherein each of the plurality of antenna elements configured to receive and transmit an individual wavelength of the modulated optical beam.

In some examples, in the transmitter, each of the plurality of antenna elements comprise a photodiode and a power amplifier.

In some examples, in the transmitter, the EOM is a Mach Zehnder modulator.

BRIEF DESCRIPTION OF THE FIGURES

The accompanying drawings, which are incorporated in, and constitute a part of this specification, illustrate implementations of the present teachings and, together with the description, serve to explain the principles of the disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Wherever convenient, the same reference numbers will be used throughout the drawings to refer to the same or like parts.

Generally speaking, a receiver and a transmitter are disclosed that are applicable to space, air or ground RF communication systems and mitigate the common performance parameter constraints (e.g. bandwidth and dynamic range) associated with a traditional RF design. The disclosed approach is applicable to systems where one or more signals of multiple types and characteristics are present in any given beam such as a communication spot beam on a high-throughput satellite.

The receiver comprises a first optical frequency comb that is configured to generate a multitude of equidistantly spaced optical wavelengths. The receiver also comprises a first 1 by P wavelength division multiplexer (WDM1) that is configured to receive the multitude of equidistantly spaced optical wavelengths and is further configured to split the multitude of equidistantly spaced optical wavelengths into individual optical wavelengths such that each individual optical wavelength is outputted as a separate carrier signal to each of the P optical modulators such that a total incoming radio frequency (RF) beam field incident on each of the P receiving elements modulates a separate optical wavelength in each optical modulator. The receiver further comprises a second wavelength division multiplexer (WDM2) that is configured to receive each output from each of the optical modulators, such that all modulated wavelengths are combined together into a single output to form a combined signal. The receiver still further comprises an N input ports by M output ports optical switch that is configured to receive the combined signal from the WDM2 into at least one input port, and further configured to switch the combined signal to an output port terminated in one Fiber-Bragg grating (FBG), each FBG having different wavelength dispersion properties, such that different time delays are introduced between different wavelengths in each fiber. For example, typical arrayed waveguide gratings (AWGs) used in telecommunication have 32 or 40 ports. In some instances, AWGs can have up to 128 ports. However, the performance for higher count ports tend to begin to degrade. For typical commercial off the shelf switches, N=96 and M=96 are available. N and M can be different combinations and for custom assemblies the ports count may be increased with N<M, thus allowing larger number of beam directions.

The transmitter comprises an optical frequency comb that is configured to generate a multitude of equidistantly spaced optical wavelengths. The transmitter also comprises an electro-optic modulator (EOM) that is configured to receive the multitude of equidistantly spaced optical wavelengths and a data signal and produce a modulated optical beam that is modulated with the data signal. The transmitter further comprises an optical circulator that is configured to receive the modulated optical beam at an input port. The transmitter still further comprises an N input ports by M output ports optical switch that is configured to receive the modulated optical beam from a first output port of the optical circulator, and further configured to switch the modulated optical beam to an output port of the optical switch terminated in one or more Fiber-Bragg gratings (FBGs), each FBG having different wavelength dispersion properties, such that different time delays are introduced between different wavelengths in each fiber. The transmitter still further comprises a 1 by P wavelength division multiplexer (WDM1) that is configured to receive individual wavelengths of the modulated optical beam that are time-delayed from a second output port of the optical circulator. The transmitter still further comprises a plurality of antenna elements, wherein each of the plurality of antenna elements configured to receive and transmit an individual wavelength of the modulated optical beam.

The transmitter and receiver as disclosed herein provides for a number of improvements over the conventional devices. First, the use of the optical frequency comb (also called an optical fiber comb) allows for the total RF field that is incident on an antenna phase array to be modulated onto the optical frequency comb with each wavelength carrying the field on one phased array element. By using optical dispersion to introduce time delay between the different wavelengths, which corresponds to a phase shift between the different RF elements, reconstruction of one of the incident beams can be achieved independent of the frequency of the incident RF field. By combining the reconstructed beam with another optical frequency comb allows for channelizing down to smaller bandwidths. Combining an N×M switch with fiber brag grading allows for forming a fast reconfigurable true time delay based RF beam former. The transmitter and receiver are electronically switchable and allows for fast beam scanning in search or tracking applications. The N×M switch and FBGs can be implemented with several of the FBGs tunable. This will allow very fine beam pointing control once the initial search has localized the beam. The N×M switch can be used in a tracking mode, where a satellite as it passes above the Earth sequentially switches a channel to different beam pointing angles, but simply routing to a different dispersion FBG. The N×M switch with the FGB beam forming does not depend on the RF signal frequency and bandwidth. Once the OFC frequency separation is correctly selected in order to allow sufficient space for the modulated sidebands, the RF carrier frequency and the total RF bandwidth have no effect on the beam forming.

Figure 1:
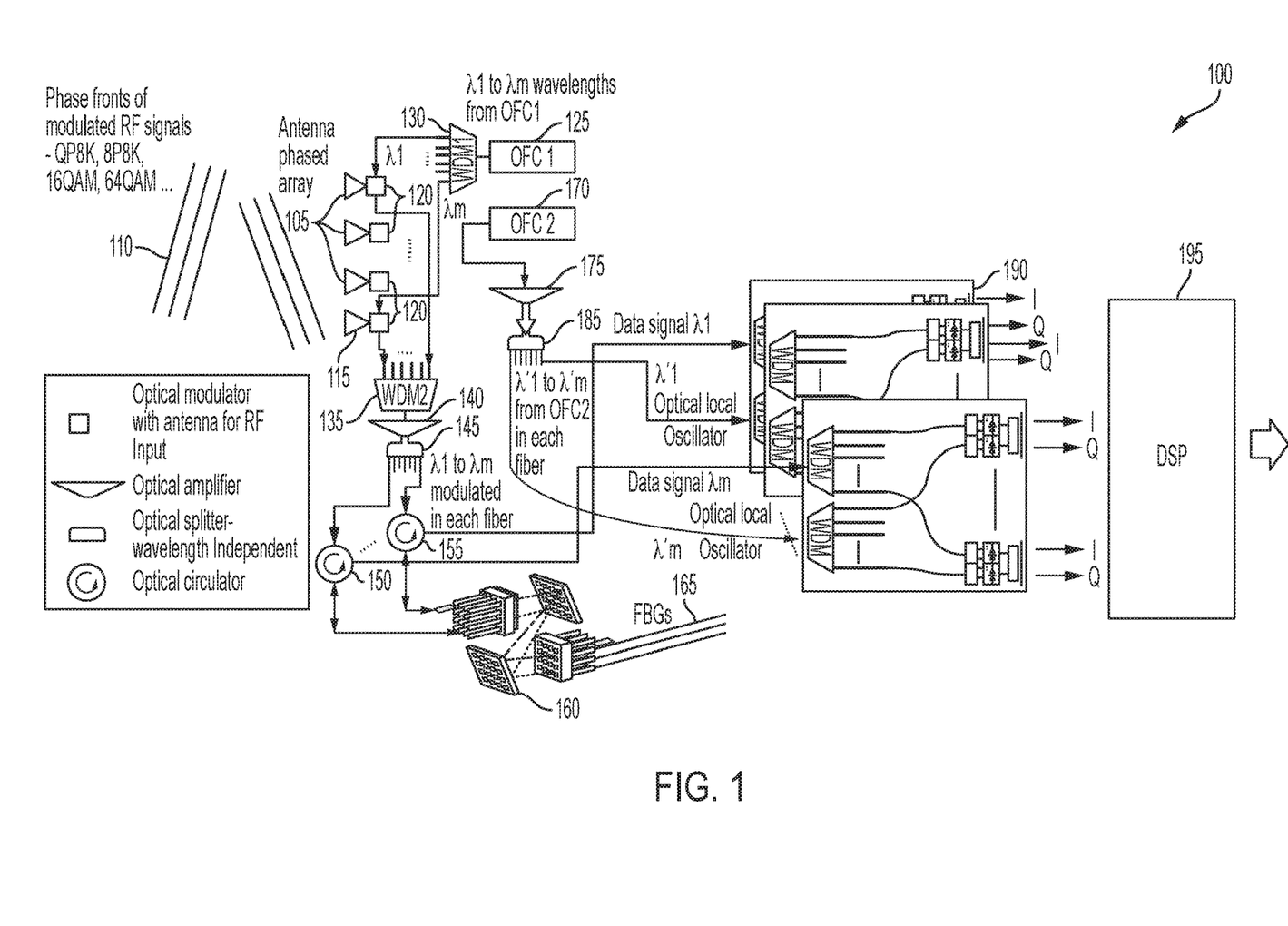
FIG. 1 shows a receiver according to examples of the present disclosure.

FIG. 1 shows receiver 100 according to examples of the present disclosure. Receiver 100 comprises plurality of antenna phased array receiving elements 105 that are configured to receive incident RFs 110 from a variant of angles. Each of plurality of phased array receiving elements 105 comprise receiver Low Noise Amplifier (LNA) 115 and optical modulator 120.

Receiver 100 also comprises first optical frequency comb (OFC 1) 125 that is configured to generate a multitude of equidistantly spaced optical wavelengths. In some examples, first OFC 1 125 is configured such that adjacent frequency separation is more than 2 times larger than a maximum RF frequency expected to be received by phased array receiving elements. Other suitable frequency separations can be used.

Receiver 100 also comprises first 1 by P wavelength division multiplexer (WDM1) 130 that is configured to receive the multitude of equidistantly spaced optical wavelengths. First WDM1 130 is further configured to split the multitude of equidistantly spaced optical wavelengths into individual optical wavelengths such that each individual optical wavelength is outputted as a separate carrier signal to each of the P optical modulators such that a total incoming radio frequency (RF) beam field incident on each of the P receiving elements modulates a separate optical wavelength in each optical modulator. In some examples, first WDM1 130 has channel to channel separation equal to an adjacent frequency spacing of the first optical frequency comb. Other suitable channel-to-channel separation can be used.

Receiver 100 further comprises second wavelength division multiplexer (WDM2) 135 that is configured to receive each output from each of the optical modulators, such that all modulated wavelengths are combined together into a single output to form a combined signal. In some examples, second WDM2 135 has channel to channel separation equal to an adjacent frequency spacing of the first frequency comb. Other suitable channel-to-channel separation can be used. In some examples, second WDM2 135 is configured to have a band-pass more than 2 times larger than a maximum RF frequency expected to be received by the phased array elements. Other suitable band-pass parameters can be used.

In some examples, a number of channels in WDM1 130 and WDM2 135 are at least a number of phased array receiving elements. Other suitable number of channels can be used. In some examples, optical paths between WDM1 130 and WDM2 135, including each optical modulator are equal within 1 mm difference. Other suitable optical path lengths can be used.

Receiver 100 also comprises first optical amplifier 140 that receives the output of WDM2 135, and which provides an input to first wavelength independent optical splitter 145. First optical amplifier 140 and first wavelength independent splitter 145 are interposed between WDM2 135 and optical switch 160 such that WDM2 135 outputs to first optical amplifier 140, which in turn outputs to first wavelength independent optical splitter 145, which in turn outputs to each input port of optical switch 160. Optical switch 160 can be micro-electromechanical system (MEMS)-based or piezoelectric-based non-blocking optical cross connect switches. Optical switch 160 connects any input to any output and does not have a dependence on signal baud rate/RF modulation and has typical signal loss of less than 1 dB.

The output is provided to first optical circulator 150 and second optical circulator 155. First optical circulator 150 that is interposed between WDM2 135 and FBGs 165. In some examples, second optical circulator 155 can be a Pth circulator, where P is equal to the number of channels in WDM2 135. In some examples, an output of first optical circulator 150 and/or second optical circulator 155 carries all wavelengths representing signals from individual phased array elements forming a specific beam direction due to a true time delay imposed between different wavelengths.

Receiver 100 still further comprises N input ports by M output ports optical switch 160 that is configured to receive the combined signal from WDM2 135 into at least one input port. Optical switch 160 is further configured to switch the combined signal to an output port terminated in one Fiber-Bragg grating (FBG) 165, or another suitable fiber-based wavelength dispersive element-based material, each FBG having different wavelength dispersion properties, such that different time delays are introduced between different wavelengths in each fiber. FBG 165 are structured (periodic or chirped) variations of the index of refraction in a fiber. These index perturbations induce wavelength dispersion or simply form wavelength selective reflecting mirrors. For example, FBG 165 comprises linearly chirped variations along the length of the fiber, which serve as narrowband wavelength selective reflecting mirrors. The separation between the different FBGs introduces time delay between different wavelengths. In some examples, the FBGs at outputs of the optical switch introduce time delays between the different wavelengths that are representative of true time delays with which phased array receiver elements are illuminated from RF beam field wave-fronts arriving from different directions. In some examples, a number of N inputs for optical switch 160 corresponds to a number of RF beams that can be simultaneously acquired on the phased array receiver elements. In some examples, a number of M outputs from optical switch 160 correspond to a number of different RF beam directions that can be resolved. In some examples, optical switch 160 enables selection of the output port with the FBG that introduces specific true time delays between wavelengths representative of a selected RF beam direction.

Receiver 100 further comprises second optical frequency comb (OFC 2) 170. OFC 1 125 generates optical wavelengths separated by 25 to 200 GHz and OFC 2 170 generates optical wavelengths separated by 25 to 200 GHz plus a small offset ranging from 25 to 200 MHz. Output of OFC 2 170 is provided to second optical amplifier 175 and then to second wavelength independent optical splitter 185. The output of optical circulator 135 and second wavelength independent optical splitter 185 are then routed to signal channelization and processing elements 190 and to digital signal processor (DSP) 195 for processing. DSP 195 allows electronic amplitude balancing between the signals acquired by the individual RF antennas. The true beam forming involves aligning the phases with the true time delay, as described above, equalizing amplitudes to compensate for possible systematic losses in the receiver. This can be done electronically since it is easy to digitally change the magnitude of the signal. Receiver 100 allows for simultaneous parallel acquisition processing of N RF beam directions.

Figure 2:
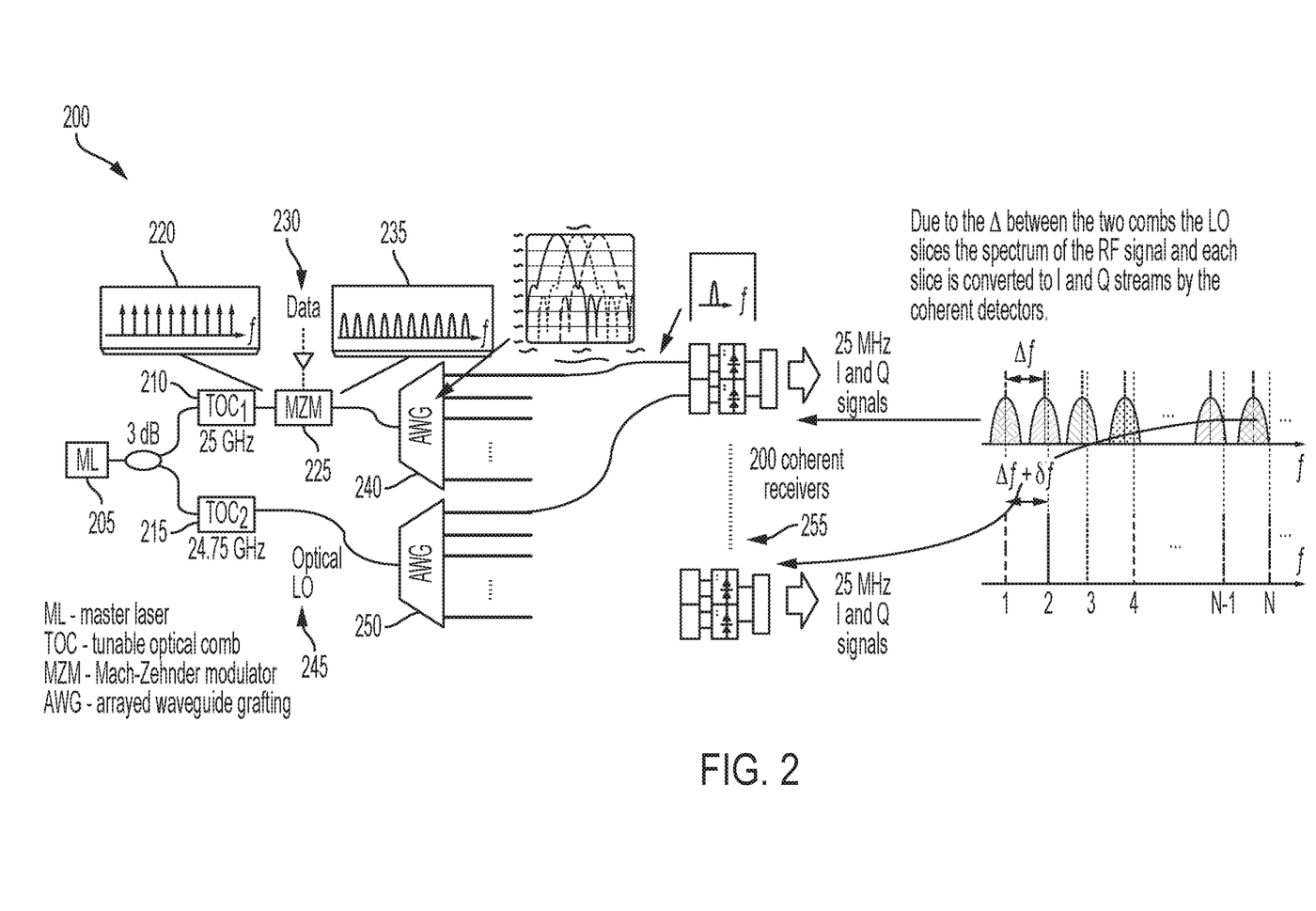
FIG. 2 shows a system for channelization with two coherent frequency combs according to examples of the present disclosure.

FIG. 2 shows system for channelization with two coherent frequency combs 200 according to examples of the present disclosure. In order to down-convert and channelize the acquired RF bandwidth, two coherent optical combs are used with relative frequency offset A. The offset is selectable and can range between 100 KHz to 1 GHz. In the example shown in FIG. 2, the offset is fixed at 25 MHz. In this example, first frequency comb 205 and second frequency comb 210 can have 200 lines separated by 25 GHz and 24.75 GHZ, respectively, occupying around 40 nm of gain spectrum. Frequency combs composed of silica and silicon-based frequency combs have been demonstrated with greater than 100 nm gain spectrum. The RF signal (data) is multicast on the 25 GHz frequency comb using MZI. Second frequency comb 210 at 24.75 GHz serves as an optical Local Oscillator (LO). Due to the frequency difference between first frequency comb 205 and second frequency comb 210, the LO slices the spectrum of the RF signal and each slice is converted to I and Q streams by the coherent detectors.

As shown in FIG. 2, output of master laser 205 is split and provided to first tunable optical frequency comb (TOC 1) 210 and second tunable optical frequency comb (TOC 2) 215. Spectrum 220 from TOC 1 shows a plurality of equally spaced optical frequencies. Electro-optical modulator 225, such as a Mach-Zehnder modulator (MZM) receives data 230 and the output from TOC 1 210 and modulates data 230, resulting in modulated spectrum 235. Output of electro-optical modulator 225 is provided to first arrayed waveguide grating (AWG 1) 240 and output of TOC 2 215, which functions as optical local oscillator 245, is provided to second arrayed waveguide grating (AWG 2) 250. Coherent receivers 255 receives that output of AWG 1 240 and AWG 2 250.

Figure 3:
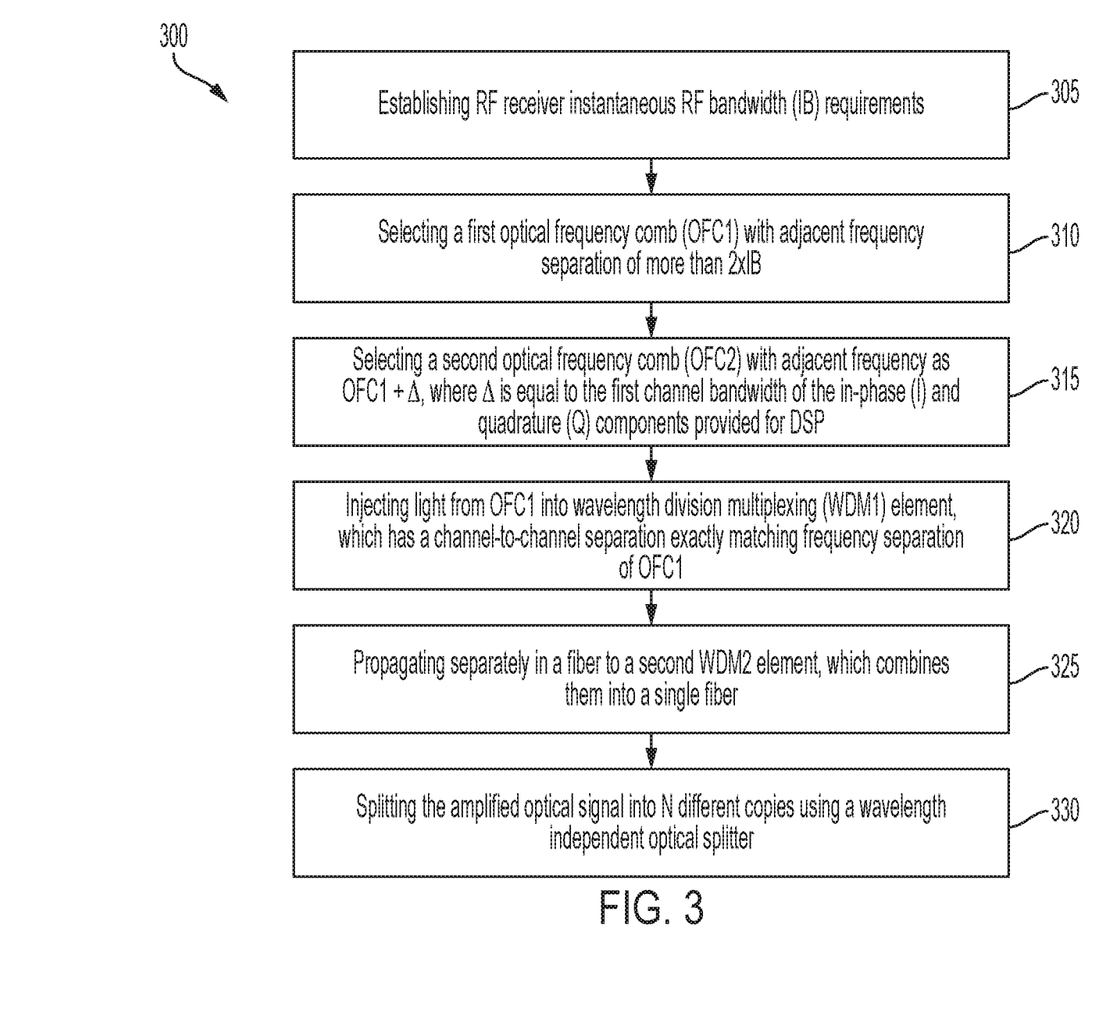
FIG. 3 shows a method of receiving according to examples of the present disclosure.

FIG. 3 shows a method of receiving 300 according to examples of the present disclosure. Method of receiving 300 comprises establishing RF receiver instantaneous RF bandwidth (IB) requirements at 305. Method of receiving 300 further comprises selecting a first optical frequency comb (OFC1) with adjacent frequency separation of more than 2×IB at 310. The number of comb frequencies are two times the number of receiver phased array elements. In order to increase system gain, OFC1 output power can be maximized. Method of receiving 300 further comprises selecting a second optical frequency comb (OFC2) with adjacent frequency as OFC1+A, where A is equal to the first channel bandwidth of the in-phase (I) and quadrature (Q) components provided for DSP at 315. For example, typical range for A is between 10 MHz to 1 GHz. Method of receiving 300 further comprises injecting light from OFC1 into wavelength division multiplexing (WDM1) element, which has a channel-to-channel separation exactly matching frequency separation of OFC1 at 320. Each fiber output of WDM1 carries a single wavelength from OFC1, which is steered towards an electro-optical modulator having RF signal from phased array element as data input. The modulator can be directly connected to an antenna element or be at the output of a low noise amplifier (LNA). Once all optical wavelengths are modulated with the incoming RF field in each modulator, method of receiving 300 continues by propagating separately in a fiber to a second WDM2 element, which combines them into a single fiber at 325. The individual fiber paths between WDM1 and WDM2 is identical to within less than 1 mm in order to minimize phase errors in the following RF beam forming stage. The combined optical wavelengths contain the total RF field incident on the phased array from all directions. The signal is optically amplified, which provides uniform RF gain to the total RF field. Method of receiving 300 continues by, in order to separate the individual RF beams incident on the phased array, splitting the amplified optical signal into N different copies using a wavelength independent optical splitter at 330. Each output coupled into a fiber has identical copy of the signal as in the output of WDM2 and it is provided to the N input ports of an optical non-blocking switch. The lengths of optical paths between the optical splitter and switch are identical to less than 1 mm.

Optical switch 160 has N input and M outputs, which N is less than or equal to M. Optical switch 160 is electronically controlled and each input can be steered to any output. Each output of optical switch 160 is connected to FBG 165, which are designed with different dispersive properties leading to back reflection of the different wavelengths from different points along the optical fiber. All wavelengths imported into the switch are eventually sequentially retro-reflected and depending on the dispersion properties of the FBG different time delay is imposed between them. This process constitutes true time delay with respect to the RF signals and does not depend on the properties of the incident RF field. The process of introducing time delays between the different wavelengths allows in each optical path after the switch to alight the RF fields of one beam direction.

Figure 4:
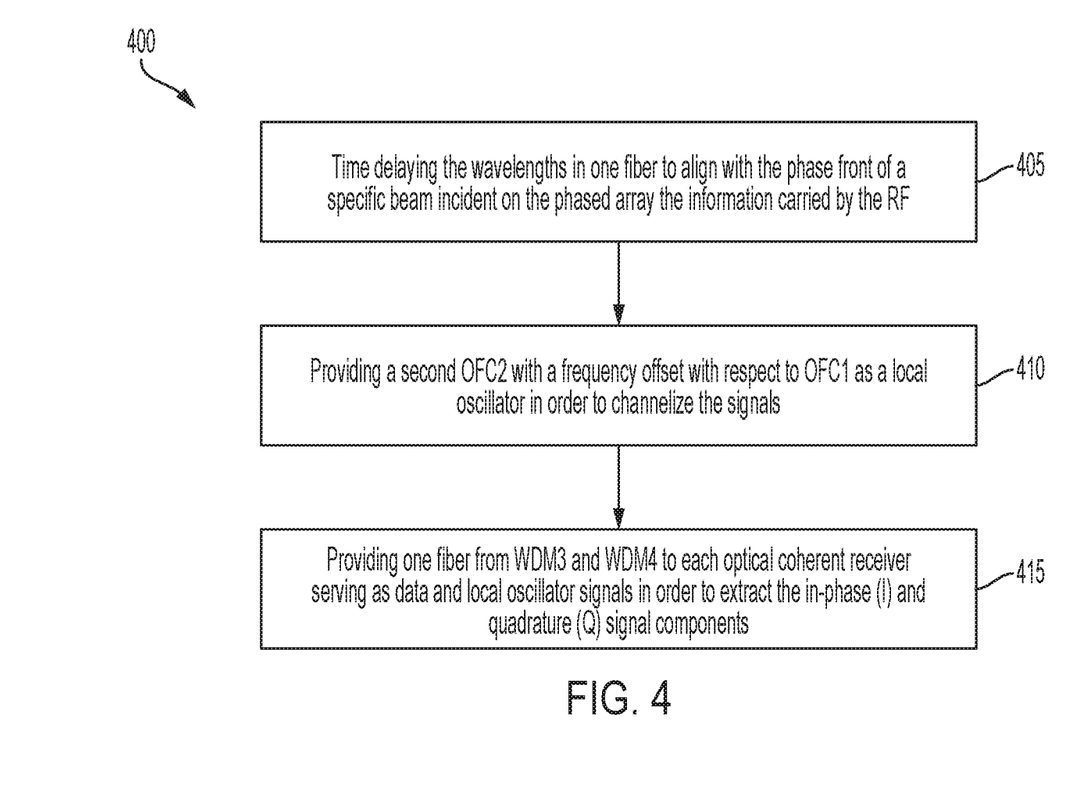
FIG. 4 shows a method of signal channelizing according to examples of the present disclosure.

FIG. 4 shows a method of signal channelizing 400 according to examples of the present disclosure. Method of signal channelizing 400 comprises time delaying the wavelengths in one fiber to align with the phase front of a specific beam incident on the phased array the information carried by the RF at 405. Channelization provides for smaller bandwidths for processing and decoding. The channelization uses the fact that each fiber carries multiple wavelengths each with a replica of RF field. Each fiber from the output of a circulator is coupled to a WDM3, which separates the different wavelengths into individual fibers. Method of signal channelizing 400 continues by providing a second OFC2 with a frequency offset with respect to OFC1 as a local oscillator in order to channelize the signals at 410. OFC2 is also coupled into a WDM4 in order to separate the individual wavelengths into separate fibers. An array of optical coherent receivers equal to the number of wavelengths in OFC1 and OFC2 is used to channelize the incoming data. Method 400 continues by providing one fiber from WDM3 (e.g., AWG 1 240) and WDM4 (e.g., AWG 2 250) to each optical coherent receiver serving as data and local oscillator signals in order to extract the in-phase (I) and quadrature (Q) signal components at 415. This generates N pairs of I and Q signals streams, which are fed for following DSP analysis. Receiver 100 has N beam forming paths and each is outputted in an array of coherent receivers. Therefore, receiver 100 generates total of N×N pairs of I and Q signals representing N RF beams incident onto the phased array with sub-channel bandwidth equal to IBN.

Figure 5:
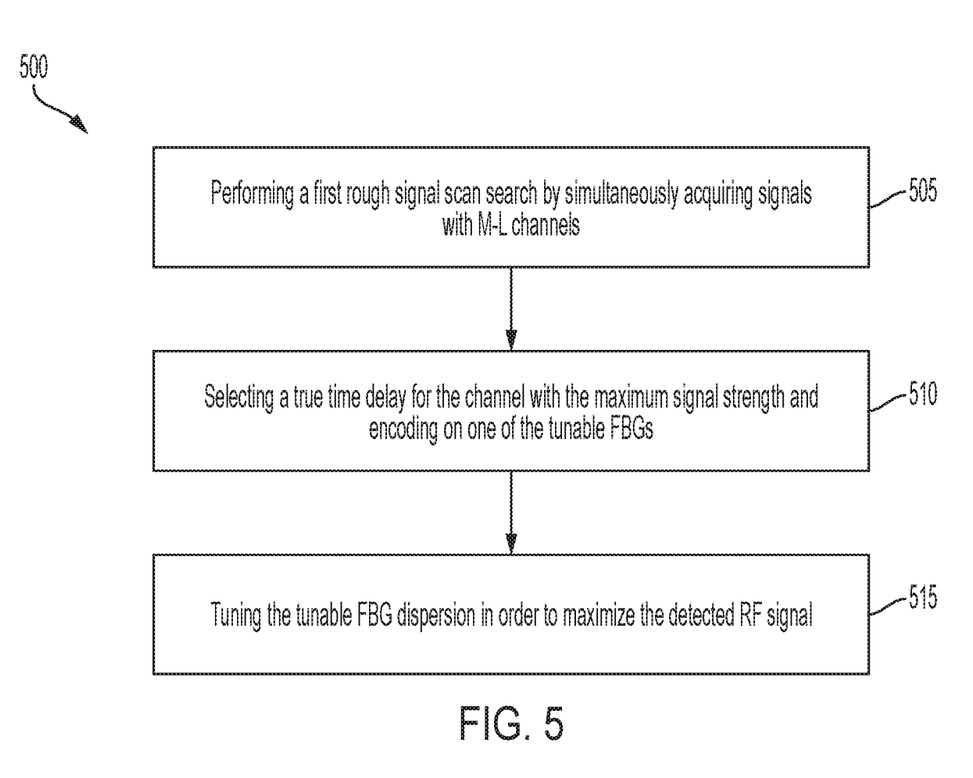
FIG. 5 shows a method of beam scanning and signal acquisition used in a search pattern scenario according to examples of the present disclosure.
Figure 6:
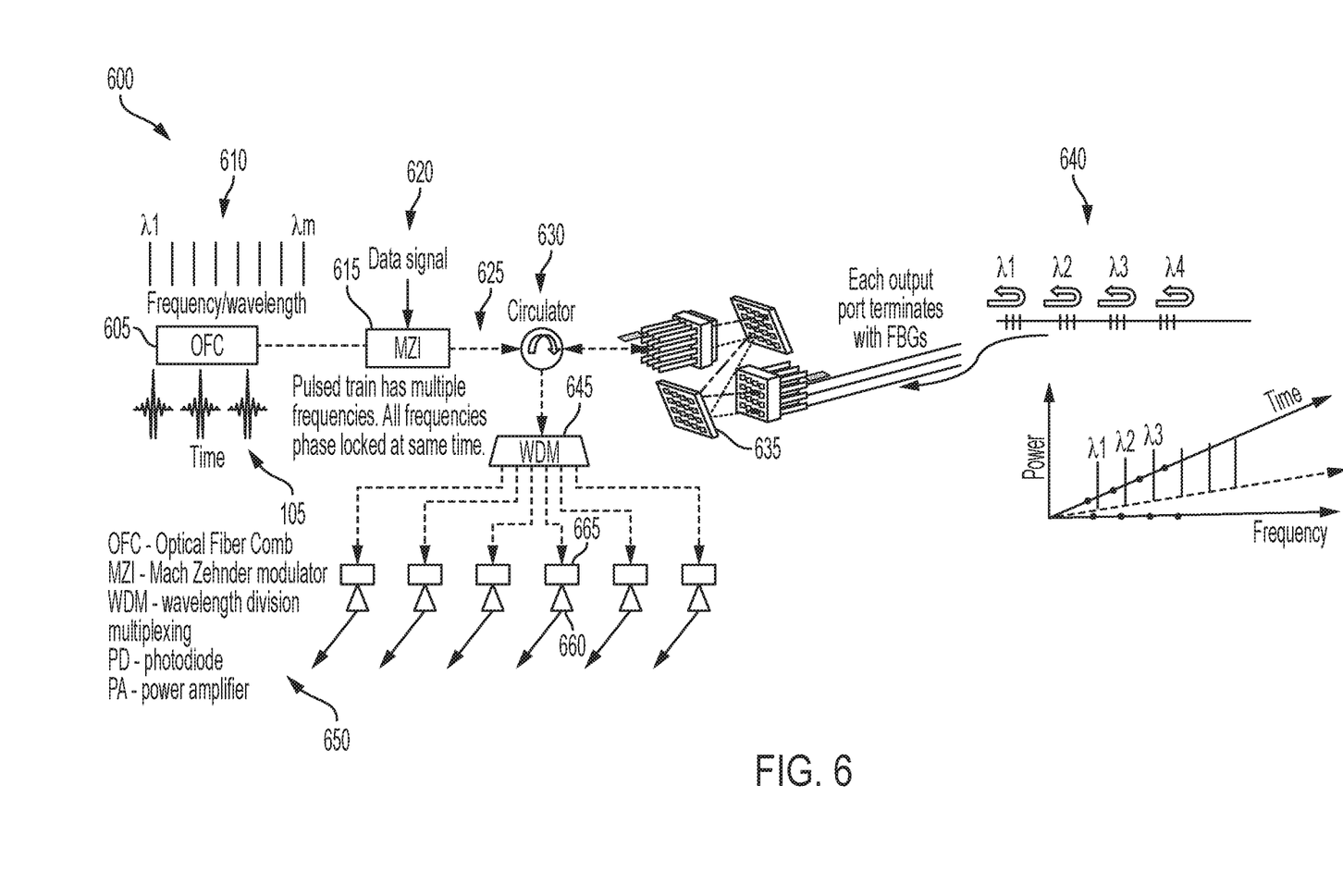
FIG. 6 shows a transmitter according to examples of the present disclosure.

FIG. 5 shows a method of beam scanning and signal acquisition 500 used in a search pattern scenario according to examples of the present disclosure. Method of beam scanning and signal acquisition 500 can be implemented with a beam former with an optical switch and FBGs arranged with M-L fixed dispersion FBGs and L tunable dispersion FBFs. Method of beam scanning and signal acquisition 500 comprises performing a first rough signal scan search by simultaneously acquiring signals with M-L channels at 505. Once a signal is identified, method of beam scanning and signal acquisition 500 continues by selecting a true time delay for the channel with the maximum signal strength and encoding on one of the tunable FBGs at 510. Method of beam scanning and signal acquisition 500 continues by tuning the tunable FBG dispersion in order to maximize the detected RF signal at 515. The maximum signal corresponds to optimal alignment with the incoming RF beam. In some examples, the signal acquisition stability can be improved with a feedback locking loop. Method of beam scanning and signal acquisition 500 can be repeated for multiple beams and they can be tracked. Once a beam walks off the range of a tunable FBG, it can be passed onto a different tunable FBG FIG. 6 shows transmitter 600 according to examples of the present disclosure. Transmitter 600 comprises a transmitter optical frequency comb (OFC) 605 that is configured to generate a multitude of equidistantly spaced optical wavelengths, as shown in transmitter spectrum 610.

Transmitter 600 also comprises an electro-optic modulator (EOM) 615 that is configured to receive the multitude of equidistantly spaced optical wavelengths from OFC 605 and data signal 620 and produce a modulated optical beam 625 that is modulated with data signal 620. In some examples, EOM 615 is a Mach Zehnder modulator. Other suitable EOMs can also be used. Transmitter 600 further comprises optical circulator 630 that is configured to receive modulated optical beam 625 at an input port.

Transmitter 600 still further comprises an N input ports by M output ports optical switch 635 that is configured to receive modulated optical beam 625 from a first output port of optical circulator 630. Optical switch 635 is further configured to switch modulated optical beam 625 to an output port of the optical switch terminated in one or more Fiber-Bragg gratings (FBGs) 640, each FBG having different wavelength dispersion properties, such that different time delays are introduced between different wavelengths in each fiber.

Transmitter 600 still further comprises 1 by P wavelength division multiplexer (WDM1) 645 that is configured to receive individual wavelengths of modulated optical beam 625 that are time-delayed from a second output port of optical circulator 630.

Transmitter 600 still further comprises plurality of antenna elements 650. Each of the plurality of antenna elements 650 are configured to receive and transmit an individual wavelength of time-delayed modulated optical beam. Each of plurality of antenna elements 650 comprise photodiode 655 and power amplifier 660.

In summary, receiver 100 and transmitter 600 as described allow for receiving, transmitting, and electro-optically processing multiple simultaneous incoming beams to a phased array antenna, which eliminates or reduces beam squint. Receiver 100 provides for first OFC 1 125 with each wavelength separated and serving as a separate optical carrier wave for an optical modulator at each phased array element, with the RF delayed phased array input modulating each optical modulator. Receiver 100 also provides for N×N cross-connect optical switch 160 which switches the recombined (but delayed) optical carrier into different FBGs each tuned to reflect true time delay back into optical switch 160. Receiver 100 provides for second OFC 2 170 that is coherent but offset from the first OFC 1 125 to mix with and demodulate the true time delayed signals to produce demodulated signals to signal channelization and processing elements 190. DSP 195 can look at each of the true time delayed signals and determine which one is from which direction and the best demodulated signal.

Receiver 100 and transmitter 600 provide for true time domain beam forming, which allows for processing of signals with tenths of GHz of bandwidth. The use of coherent, ultra low phase noise optical frequency combs, e.g., OFC 1 125, OFC 2 170, OFC 605, allows for parallel spectral slicing and decomposition of multiple GHz to sub channels ranging 10 to 100 MHz, as well as in applications in RF frequency range 1-100 GHz, with upper limit set by current practical electro-optical modulators. For example, receiver 100 allows for receiving the full Ka band 26 to 40 GHz, allows for scaling both in the number of beams and bandwidth at the same time, without suffering from beam squint, eliminates or reduces the requirement of high ENOB (Effective Number of Bits) high bandwidth Analog to Digital Converters.

The advantages of the disclosed receiver and transmitter are achieved, at least in part, on advancements in coherent optical frequency combs, which provides for ultra-stable low phase noise microwave sources, time metrology, RF beam forming, signal sampling and up/down-conversion, frequency channelization and parallel signal processing. Since photonic frequencies are orders of magnitude higher than typical RF bands, they offer terahertz of bandwidth, which now with the help of optical frequency combs can be channelized and sliced to match hundreds RF frequency sub-bands allowing parallel processing and channelization. Within the V band, a test case signal was analyzed in the range of 45 to 50 GHz. Microwave photonic implementation of the disclosed receiver and transmitter modules featuring beam forming, down-conversion and channelization of a full 5 GHz bandwidth segment to sub 1 GHz selectable sub-channels was achieved. By leveraging tents to hundreds of coherent optical/frequency combs, simultaneous readout of antenna elements and then RF beam reconstruction was shown and carried with predefined dispersive elements setting true time delay, characteristic for the beam direction. The disclosed features can be applied for multiple beams at the same time and is data, modulation format, or RF frequency independent, because the true time delay is implemented in the optical domain. Signals are optically down converted from RF to base band and channelized to few hundreds of MHz bandwidth with I and Q streams generated in electrical domain. The disclosed features use electronic digital signal processing core, wrapped with a photonic layer handling the high frequencies and beam forming.

Further, the disclosure comprises embodiments according to the following clauses:

Clause 1: A receiver comprising:
a phased array antenna having P receiving elements configured such that each of the P receiving elements modulates one of P optical modulators;
a first optical frequency comb configured to generate a multitude of equidistantly spaced optical wavelengths;

a first 1 by P wavelength division multiplexer (WDM1) configured to receive the multitude of equidistantly spaced optical wavelengths and further configured to split the multitude of equidistantly spaced optical wavelengths into individual optical wavelengths such that each individual optical wavelength is outputted as a separate carrier signal to each of the P optical modulators such that a total incoming radio frequency (RF) beam field incident on each of the P receiving elements modulates a separate optical wavelength in each optical modulator;

a second wavelength division multiplexer (WDM2) configured to receive each output from each of the optical modulators, such that all modulated wavelengths are combined together into a single output to form a combined signal; and an N input ports by M output ports optical switch configured to receive the combined signal from the WDM2 into at least one input port, and further configured to switch the combined signal to an output port terminated in one Fiber-Bragg grating (FBG), each FBG having different wavelength dispersion properties, such that different time delays are introduced between different wavelengths in each fiber.

Clause 2: The receiver of clause 1, wherein the first optical frequency comb is configured such that adjacent frequency separation is more than 2 times larger than a maximum RF frequency expected to be received by phased array receiving elements.

Clause 3: The receiver of clauses 1 or 2, wherein the first wavelength division multiplexer (WDM1) has channel to channel separation equal to an adjacent frequency spacing of the first optical frequency comb.

Clause 4: The receiver of any of the clauses 1-3, wherein the second wavelength division multiplexer (WDM2) has channel to channel separation equal to an adjacent frequency spacing of the first frequency comb.

Clause 5: The receiver of any of the clauses 1-4, wherein the second wavelength division multiplexer (WDM2) is configured to have a band-pass more than 2 times larger than a maximum RF frequency expected to be received by the phased array elements.

Clause 6: The receiver of any of the clauses 1-5, wherein a number of channels in WDM1 and WDM2 are at least a number of phased array receiving elements.

Clause 7: The receiver of any of the clauses 1-6, wherein optical paths between WDM1 and WDM2, including each optical modulator are equal within 1 mm difference.

Clause 8: The receiver of any of the clauses 1-7, further comprising:

an optical amplifier; and a wavelength independent splitter with N output ports, wherein the optical amplifier and the wavelength independent splitter are interposed between the WDM2 and the optical switch such that the WDM2 outputs to the optical amplifier which in turn outputs to the wavelength independent optical splitter which in turn outputs to each input port of the optical switch.

Clause 9: The receiver of any of the clauses 1-8, wherein the FBGs at outputs of the optical switch introduce time delays between the different wavelengths that are representative of true time delays with which phased array receiver elements are illuminated from RF beam field wave-fronts arriving from different directions.

Clause 10: The receiver of any of the clauses 1-9, wherein a number of N inputs for the optical switch corresponds to a number of RF beams that can be simultaneously acquired on the phased array receiver elements.

Clause 11: The receiver of any of the clauses 1-10, wherein a number of M outputs from the optical switch correspond to a number of different RF beam directions that can be resolved.

Clause 12: The receiver of any of the clauses 1-11, wherein the optical switch enables selection of the output port with the FBG that introduces specific true time delays between wavelengths representative of a selected RF beam direction.

Clause 13: The receiver of any of the clauses 1-12, further comprising an optical circulator that is interposed between the WDM2 and the FBGs.

Clause 14: The receiver of any of the clauses 1-13, wherein an output of the optical circulator carries all wavelengths representing signals from individual phased array elements forming a specific beam direction due to a true time delay imposed between different wavelengths.

Clause 15: The receiver of any of the clauses 1-14, wherein the output of the optical circulator is routed a signal channelization and processing elements.

Clause 16: The receiver of any of the clauses 1-15, wherein simultaneous parallel acquisition processing of N RF beam directions occurs.

Clause 17: The receiver of any of the clauses 1-16, wherein true time delay formed RF beams are amplitude balanced using digital signal processing.

Clause 18: A transmitter comprising:

an optical frequency comb configured to generate a multitude of equidistantly spaced optical wavelengths;

an electro-optic modulator (EOM) configured to receive the multitude of equidistantly spaced optical wavelengths and a data signal and produce a modulated optical beam that is modulated with the data signal;

an optical circulator configured to receive the modulated optical beam at an input port;

an N input ports by M output ports optical switch configured to receive the modulated optical beam from a first output port of the optical circulator, and further configured to switch the modulated optical beam to an output port of the optical switch terminated in one or more Fiber-Bragg gratings (FBGs), each FBG having different wavelength dispersion properties, such that different time delays are introduced between different wavelengths in each fiber;

a 1 by P wavelength division multiplexer (WDM1) configured to receive individual wavelengths of the modulated optical beam that are time-delayed from a second output port of the optical circulator; and a plurality of antenna elements, wherein each of the plurality of antenna elements configured to receive and transmit an individual wavelength of the modulated optical beam.

Clause 19: The transmitter of clause 18, wherein each of the plurality of antenna elements comprise a photodiode and a power amplifier.

Clause 20: The transmitter of clause 18 or 19, wherein the EOM is a Mach Zehnder modulator.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated examples, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the examples, and may also include other parts not describe in the examples. Accordingly, the disclosure is not limited to the above-described examples, but instead is defined by the appended claims in light of their full scope of equivalents.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A receiver comprising:
    a phased array antenna having P receiving elements configured such that each of the P receiving elements modulates one of P optical modulators;
    a first optical frequency comb configured to generate a multitude of equidistantly spaced optical wavelengths;
    a first 1 by P wavelength division multiplexer (WDM1) configured to receive the multitude of equidistantly spaced optical wavelengths and further configured to split the multitude of equidistantly spaced optical wavelengths into individual optical wavelengths such that each individual optical wavelength is outputted as a separate carrier signal to each of the P optical modulators such that a total incoming radio frequency (RF) beam field incident on each of the P receiving elements modulates a separate optical wavelength in each optical modulator;
    a second wavelength division multiplexer (WDM2) configured to receive each output from each of the optical modulators, such that all modulated wavelengths are combined together into a single output to form a combined signal; and
    an N input ports by M output ports optical switch configured to receive the combined signal from the WDM2 into at least one input port, and further configured to switch the combined signal to an output port terminated in one Fiber-Bragg grating (FBG), each FBG having different wavelength dispersion properties, such that different time delays are introduced between different wavelengths in each fiber.

2. The receiver of claim 1, wherein the first optical frequency comb is configured such that adjacent frequency separation is more than 2 times larger than a maximum RF frequency expected to be received by phased array receiving elements.

3. The receiver of claim 1, wherein the first 1 by P wavelength division multiplexer (WDM1) has channel to channel separation equal to an adjacent frequency spacing of the first optical frequency comb.

4. The receiver of claim 1, wherein the second wavelength division multiplexer (WDM2) has channel to channel separation equal to an adjacent frequency spacing of the first optical frequency comb.

5. The receiver of claim 1, wherein the second wavelength division multiplexer (WDM2) is configured to have a bandpass more than 2 times larger than a maximum RF frequency expected to be received by phased array elements.

6. The receiver of claim 1, wherein a number of channels in WDM1 and WDM2 are at least a number of phased array receiving elements.

7. The receiver of claim 1, wherein optical paths between WDM1 and WDM2, including each optical modulator are equal within 1 mm difference.

8. The receiver of claim 1, further comprising:
an optical amplifier; and
a wavelength independent optical splitter with N output ports,
wherein the optical amplifier and the wavelength independent optical splitter are interposed between the WDM2 and the optical switch such that the WDM2 outputs to the optical amplifier which in turn outputs to the wavelength independent optical splitter which in turn outputs to each input port of the optical switch.

9. The receiver of claim 8, wherein the FBGs at outputs of the optical switch introduce time delays between different wavelengths that are representative of true time delays with which the receiver elements are illuminated from RF beam field wave-fronts arriving from different directions.

10. The receiver of claim 8, wherein a number of N inputs for the optical switch corresponds to a number of RF beams that can be simultaneously acquired on the receiver elements.

11. The receiver of claim 8, wherein a number of M outputs from the optical switch correspond to a number of different RF beam directions that can be resolved.

12. The receiver of claim 8, wherein the optical switch enables selection of the output port with the FBG that introduces specific true time delays between wavelengths representative of a selected RF beam direction.

13. The receiver of claim 8, further comprising an optical circulator that is interposed between the WDM2 and the FBG.

14. The receiver of claim 13, wherein an output of the optical circulator carries all wavelengths representing signals from individual phased array elements forming a specific beam direction due to a true time delay imposed between different wavelengths.

15. The receiver of claim 14, wherein the output of the optical circulator is routed to a signal channelization and processing elements.

16. The receiver of claim 1, wherein simultaneous parallel acquisition processing of N RF beam directions occurs.

17. The receiver of claim 1, wherein true time delay formed RF beams are amplitude balanced using digital signal processing.

18. A transmitter comprising:
an optical frequency comb configured to generate a multitude of equidistantly spaced optical wavelengths;
an electro-optic modulator (EOM) configured to receive the multitude of equidistantly spaced optical wavelengths and a data signal and produce a modulated optical beam that is modulated with the data signal;
an optical circulator configured to receive the modulated optical beam at an input port;
an N input ports by M output ports optical switch configured to receive the modulated optical beam from a first output port of the optical circulator, and further configured to switch the modulated optical beam to an output port of the optical switch terminated in one or more Fiber-Bragg gratings (FBGs), each FBG having different wavelength dispersion properties, such that different time delays are introduced between different wavelengths in each fiber;
a 1 by P wavelength division multiplexer (WDM1) configured to receive individual wavelengths of the modulated optical beam that are time-delayed from a second output port of the optical circulator; and
a plurality of antenna elements, wherein each of the plurality of antenna elements configured to receive and transmit an individual wavelength of the modulated optical beam.

19. The transmitter of claim 18, wherein each of the plurality of antenna elements comprise a photodiode and a power amplifier.

20. The transmitter of claim 18, wherein the EOM is a Mach Zehnder modulator.

* * * * *